Aug. 22, 1944.  T. KÜMMICH  2,356,522
CHANGE SPEED GEAR
Filed May 13, 1940  2 Sheets-Sheet 1
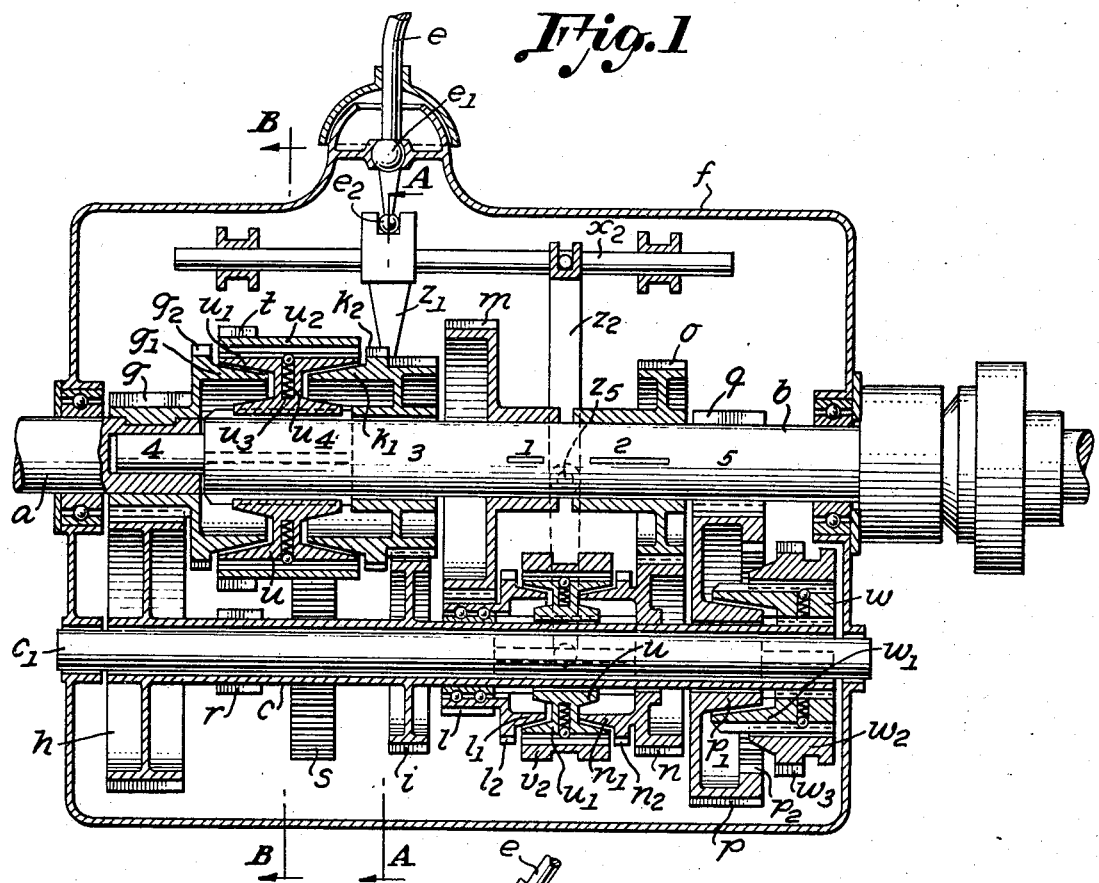
Inventor:
THEODOR KUMMICH
By
Attorney.

Aug. 22, 1944.　　　　T. KÜMMICH　　　　2,356,522
CHANGE SPEED GEAR
Filed May 13, 1940　　　　2 Sheets-Sheet 2
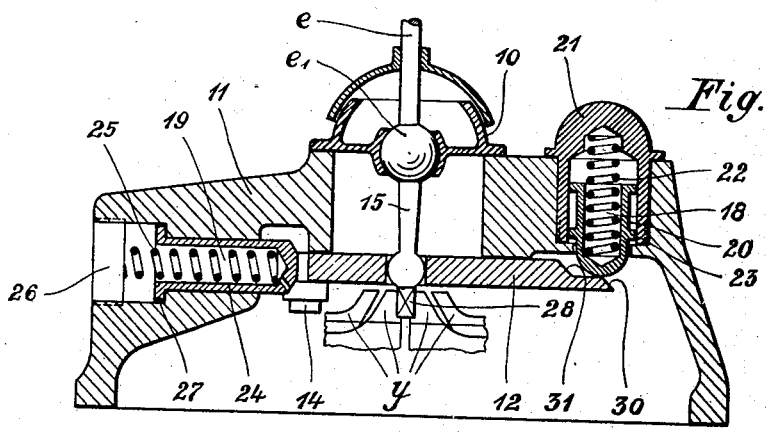
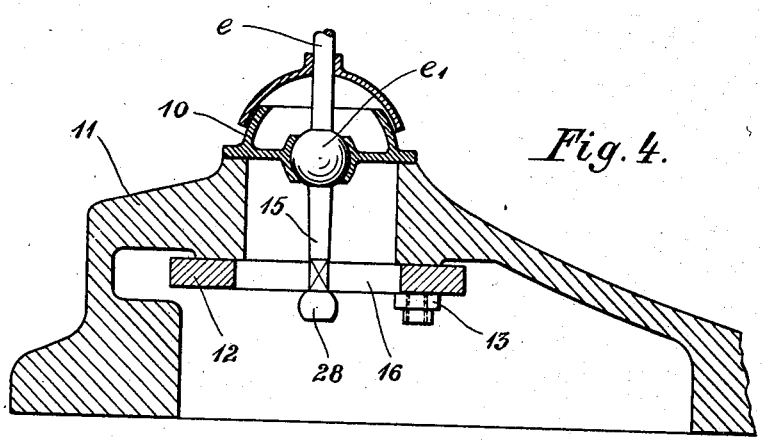
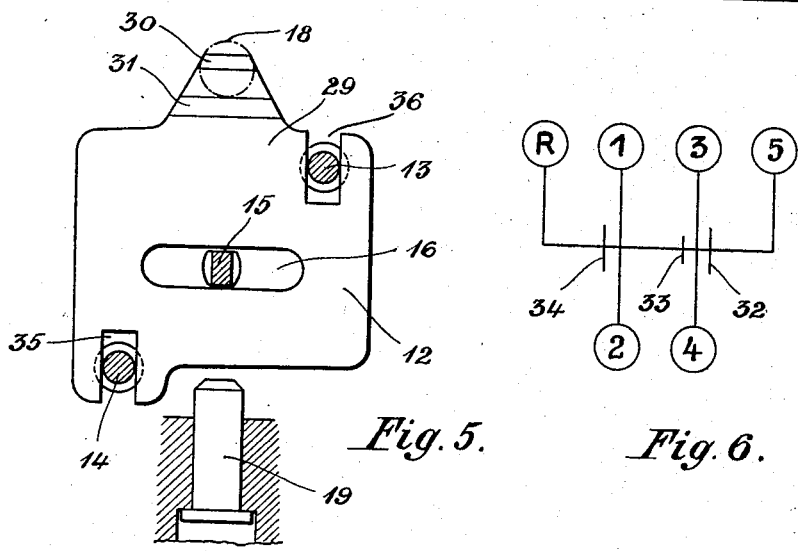
INVENTOR
THEODOR KÜMMICH
BY
ATTORNEYS Patented Aug. 22, 1944

2,356,522

UNITED STATES PATENT OFFICE 2,356,522

CHANGE-SPEED GEAR

Theodor Kummich, Stuttgart, Germany; vested in the Alien Property Custodian

Application May 13, 1940, Serial No. 334,745
In Germany May 13, 1939

6 Claims. (Cl. 74—359)

The invention refers to the improvement of change speed gears specially for motor vehicles, and its object is above all light and compact construction combined with an easy shifting of the gear.

The object of the invention is in particular the control of the gears in pairs by means of change over couplings, the arrangement being made in such a way, in contrast with similar gears, that the control of the speeds is effected by means of a hand operated lever or by a similar arrangement, without any complicated intermediate arrangements, and that also when besides the four usual forward speeds including the direct drive and the reverse, specially a fifth speed or a so called over-direct drive is included in the control.

Furthermore the invention provides a special advantageous, space—and weight—saving arrangement of the reverse gear and an advantageous arrangement of the fifth speed.

In order to accomplish the advantages aimed at, the invention provides above all such an arrangement of the gear members that the members for the direct drive and the next lower speed, lie next to each other at the side of the driving shaft, and are controlled alternatively by a change over coupling, while the gear members for the rest of the forward speeds are located more towards the driving side, particularly in such way that for facilitating the shifting the gear-pairs of these speeds are all coupled with the driven shaft during the shifting action. By these means the masses which are to be braked are reduced respectively avoiding shocks and injurious oscillations within the gears.

The reverse preferably is formed by a simple intermediate wheel engaging on one side the outer tooth gearing of the coupling sleeve between the direct drive and the next lower speed and on the other side a tooth gearing of the transmission shaft. Furthermore the gear wheels of the over-direct drive or the fifth speed are arranged at the outermost end of the gear-half facing towards the driven side of the gear, while the pair of gear wheels serving for the permanent transmission from the driving shaft to the transmission shaft, lie on the opposite side, the driving side of the gear. This procures the advantage that the pair of gear wheels serving for the permanent transmission and the over-direct drive lie next to the bearings, and therefore the over-direct drive which is most used besides the direct drive will have gear wheels which are safely and smoothly journaled.

A further feature of the invention serving for facilitating the shifting and for preserving the gear wheels is contained in the fact that all speeds with exception of the reverse are controlled by means of synchronising arrangements.

It is very practical to control the first and second as well as the third and fourth speed by means of change over couplings. The gear wheels of the over-direct drive arranged at the driven side of the gear, which are preferably operated over a synchronising arrangement may be shifted separately. In consequence of the very compact and short manner of construction of the gear for the main and transmission shafts only two bearings each are required in order to guarantee a sufficiently quiet running of the gear.

Practically the arrangement is made in such a way that when throwing in the over-direct drive the lever is laid over in opposite direction to the anteceding direct drive speed. This facilitates essentially the shifting, as when changing over from direct drive to over-direct drive the lever must not be swung backwards again in U-shape, as for instance with other well known gears, but may continue to move in the started direction with a little transverse swing.

For further facilitating the shifting and for increasing its safety the invention provides springy arrangements which have to be overcome when shifting from one speed to another one. For this purpose specially in the path travelled by the main controlling lever yielding stops are arranged, which must be pressed back when throwing in or out the fifth speed or over-direct drive. This arrangement facilitates controlling of the speeds lying for instance outside of an H-shaped mechanism. In a practical type of construction a cross member, for instance a cross sliding plate is connected to the main controlling lever which leans against yielding stops when swinging the controlling lever in transverse direction. Preferably for the over-direct drive a double stop is provided which causes a perceptible obstruction in the movement of the controlling lever as well when throwing the over-direct drive as also when reversing from this speed to the next lower speeds.

Furthermore with respect to the operating member the stops may be so arranged that they act only momentarily onto the controlling member but do not obstruct any more a further shifting in a transverse direction. This arrangement allows for instance several obstructions which are perceptible for the operator to act upon the control member by the same stop, for instance in such manner that a stop arranged angularly to the transverse motion of a cross member connected to the controlling lever, touches several succeeding slanting faces of the cross member.

The stops may preferably be subject to different spring action, specially thus that the speed which should be most safeguarded, particularly the reverse speed, the involuntary throwing-in of which might cause heaviest injuries, is safeguarded by the most powerful spring.

In the drawings by way of example two types of the invention are illustrated:

Fig. 1 shows a longitudinal section through a five-speed gear;

Fig. 2 shows the same gear in section, the right hand side being a section through the line A—A, the left one a section through the line B—B.

Fig. 3 is a cross section through the cover of a gear casing for a similar gear but with a somewhat altered controlling device;

Fig. 4 is a longitudinal section through this cover.

Fig. 5 is a view from above onto the pertaining sliding plate;

Fig. 6 shows the shifting diagram of the five-speed gear according to the two examples shown.

In the example according to Figs. 1—2 the change speed gear enclosed by the casing $f$ consists of a driving shaft $a$, a driven shaft $b$ and the hollow transmission shaft $c$, journaled rotating freely upon the fixed shaft $c_1$. For the reverse an intermediate shaft $d$ is provided. Solid with the shaft $a$ is the spur wheel $g$ which engages the spur wheel $h$ arranged on the hollow transmission shaft $c$. The hollow shaft $c$ carries besides the spur wheel $h$ the other spur wheels $r$, $i$, $l$, $n$ and $p$, the wheels $h$, $r$, $i$ being solid with the transmission shaft $c$ and the wheels $l$, $n$ and $p$ are loosely turnable on this shaft. With the hollow shaft $c$ furthermore the shifting sleeves are unturnably but axially movably connected. On the driven shaft $b$ the spur wheels $k$, $m$, $o$ and $q$ are arranged, the wheels $m$, $o$ and $q$ being solid with the shaft while the wheel $k$ is loosely turnable on this shaft. The shifting sleeve $u$ arranged furthermore on the driven shaft is connected with it unturnably but axially movable.

The shifting sleeve $u$ is formed to a change over coupling and carries on its circumference the axially movable but unturnably connected sleeve $u_2$ with interior teeth which may alternatively engage the claws $g_2$ and $k_2$, the sleeve $u$ being provided for the purpose of a previous synchronising of the parts to be coupled with conical coupling faces acting together with the corresponding conical coupling parts $g_1$, $k_1$, of the toothed wheels $g$ and $k$ respectively. By means of a spring $u_3$ a ball $u_4$ is pressed into the recess of the sleeve $u_2$ causing between the sleeve $u$ and the movable sleeve $u_2$ a power transmitting connection.

In a similar manner the sleeve $v$ formed as a change over coupling is provided with a sliding sleeve $v_2$ and conical coupling faces $v_1$ coacting with corresponding coupling parts $l_1$ and $n_1$ respectively of the toothed wheels $l$ and $n$. The sleeve $v_2$ may engage alternatively the claws $l_2$ and $n_2$ respectively, synchronising previously the parts to be coupled by the conical couplings $v_1$, $l_1$ and $v_1$, $n_1$. Furthermore on the shifting sleeve $w$ containing the conical part $w_1$ coacting with the corresponding conical face $p_1$ of the toothed wheel $p$ for the purpose of synchronising the parts $w$ and $p$, a sleeve $w_2$ is arranged unturnably but axially movable. It is provided with claw-formed teeth $w_3$ which may engage after synchronisation the claws $p_2$ of the toothed wheel $p$.

For the reverse speed on the hollow shaft $c$ the spur wheel $r$ is provided and on the sliding sleeve $u$ a tooth gearing $t$ which the reverse wheel $s$ may engage. The single controlling lever $e$ is journalled in the ball joint $e_1$ and containing a ball shaped shifting head $e_2$. When swinging the controlling lever $e$ in a transverse direction the ball $e_2$ engages alternatively the shifting slots $y_1$, $y_2$, $y_3$, $y_4$ of the shifting rods $x_1$, $x_2$, $x_3$, $x_4$ while the swing of the lever $e$ in a longitudinal direction of the gear causes an axial sliding of the shifting rods $x_1$ to $x_4$. With this axial movement of the shifting rods alternatively the controlling levers $z_1$ and $z_2$ respectively the shifting fork $z_3$ or the not shown control lever for the sleeve $w_2$ are swung and the gear parts connected with it are axially displaced until the desired speeds are thrown in. In a similar way the shifting sleeve $u$ is displaced through the shifting slot $y_3$, the shifting rod $x_3$ and the fork $z_3$ and the sleeve $v$ through the shifting slot $y_2$, the shifting rod $x_2$ and the two armed lever $z_2$ turning around the pivot $z_5$. The throwing-in of the over-direct drive ensues through the shifting slot $y_4$, the shifting rod $x_4$ and the lever engaging the sleeve $w_2$ which is not shown in the drawings. The reverse finally will be thrown in through the shifting slot $y_1$, the shifting rod $x_1$ and the two armed lever $z_1$ by means of displacing the toothed wheel $s$.

The manner of operation of the gear is the following:

For throwing-in the first or starting speed the shifting rod $x_2$ is shifted to the right and with it the sleeve $v_2$ in the sliding muff $v$ so far to the left, until the synchronising coupling $v_1$, $l_1$ is thrown in and after loosening the same the claws of the sleeve $v_2$ engage the claws $l_2$ of the toothed wheel $l$. The power is transmitted from the shaft $a$ over the wheels $g$, $h$, the transmission shaft $c$, the sliding muff $v$, $v_2$ and the spur wheels $l$, $m$ onto the driven shaft $b$.

For throwing-in the second speed the shifting rod $x_2$ is shifted to the left and with it the sleeve $v_2$ with the sliding muff $v$ correspondingly to the right; the power transmission ensuing in this case from the shaft and over the wheels $g$, $h$, the transmission shaft $c$, the sliding muff $v$, $v_2$ and the spur wheels $n$, $o$ onto the driven shaft $b$.

The third speed is thrown-in by means of shifting the shifting rod $x_3$ and thereby also the sleeve $u_2$ with the muff $u$ to the right by engaging the sleeve $u_2$ to the claws $k_2$ after operating previously the synchronising arrangement $k_1$, $u_1$. Here the power is transmitted from the driving shaft $a$ over the wheels $g$, $h$, the wheels $i$, $k$ and the muff $u_2$, $u$ onto the driven shaft $b$.

For throwing-in the fourth or direct drive speed the shifting rod $x_3$ and with it the sleeve $u_2$ with the muff $u$ is shifted to the left, until the coupling $g_1$, $u_1$ engages and thereafter the sliding sleeve $u_2$ comes into solid connection with the claws $g_2$ of the spur wheel $g$. The power transmission ensues here immediately from the driving shaft $a$ over the sliding muff $u_2$, $u$ onto the driven shaft $b$.

The throwing-in of the fifth speed or the so called over-direct drive is done finally in a corresponding manner by shifting the shifting rod $x_4$ to the right, whereby the sliding sleeve $w_2$ with the shifting muff $w$ is displaced to the left. In this manner first the synchronising arrangement $w_1$, $p_1$ is operated and then the engagement of the claws $w_3$, $p_2$ is effected. The power transmission ensues from the shaft $a$ over the spur wheels $g$, $h$, the transmission shaft $c$, the sliding muff $w$, $w_2$ and the toothed wheels $p$, $q$ onto the driven shaft $b$.

The reverse speed is thrown-in by shifting the shifting rod $x_1$ to the right and thereby sliding the intermediate wheel $s$ to the left, engaging the latter on one side with the tooth gearing $t$ on the sliding muff $u_2$ and on the other side with the pinion on the transmission shaft $c$. The power transmission ensues here from the driving shaft $a$ over the spur wheels $g$, $h$, the transmission shaft $c$, the spur wheels $r$, $s$, $t$ over the shifting muff $u_2$, $u$ onto the driven shaft $b$. Eventually also the reverse might coact with a synchronising arrangement.

From the resulting shifting diagram Fig. 6 it is evident that the first and second speed on the one hand, and the third and fourth speed on the other hand are located opposite to each other. The reverse speed and the fifth or over-drive speed are arranged symmetrically at both sides of the first and third speed. Without complicated intermediate gear arrangements a clear and simple arrangement of the shifting rods $x_1$ to $x_4$ and and of the shifting slots $y_1$ to $y_4$ is the result which the controlling lever $e$ may engage according to the shifting diagram shown in Fig. 6.

The shifting arrangement may be used without essential alterations in the construction for gears with 4, 6 or more speeds. For a 4-speed gear for instance the shifting rod $x_4$ and the pertaining parts and the two toothed wheels $p$ and $q$ facing towards the driving side together with the sliding muff $w$, $w_2$ are to be omitted.

In order that the operator has a safe feeling in shifting, the shifting rods may co-operate with notches coming into effect, when the respective shifting positions or the idling position are reached.

In the example for a construction of a controlling arrangement provided with notches as shown in Figs. 3–5 applied, for instance, to the gear according to Figs. 1–2, the controlling lever $e$ is journaled with its ball shaped part $e_1$ in the bearing 10 which is screwed for instance onto the cover 11 of the gear casing. In the gear cover 11 a sliding plate 12 is arranged and held in position by the guiding piece 13, 14 sliding in the slots 35 and 36. The extension 15 of the controlling lever $e$ is led through the longitudinal slot 16 in such a manner that the transverse motion of the controlling lever $e$ is transmitted onto the sliding plate 12 by the cylindrical part 17 of the lever, while the longitudinal motion of the controlling lever $e$ in the longitudinal slot 16 may ensue without carrying the sliding plate 12 along.

In the casing cover 11 furthermore the yielding stops 18 and 19 are located in such manner that the sliding sleeve 20 of the stop 18 may move within a bushing 21 screwed into the cover 11. The pressing spring 22 for the stop 18 leans on one side against the bushing 21 and on the other side against the bushing 20, while the stop 23 of the sleeve 20 leans against a projection on the casing cover limiting the stroke towards below. The stop 19 consists of the sleeve 24 supported slidingly in the casing 11. The spring 25 leans on one side against the sleeve 24 and on the other side against the cover screw 26. The projection 27 holds the sleeve 24 in its end position.

The controlling lever $e$ furthermore engages with its cylindric end 28 the shifting slots $y$ and puts these in motion when the controlling lever moves longitudinally, throwing the respective speed steps of the gear in and out.

The sliding plate 12 is provided with an extension 29 on one side, as shown in Fig. 5, having the slanting edges 30 and 31. With these slanting edges the yielding stop 18 co-operates.

The operation of the arrangement is the following:

When shifting for instance from the first and second speed to the third and fourth speed, the spring loaded stops 18 and 19 do not come into operation. If however the fifth or over-direct drive speed should be thrown-in, previously the main controlling lever $e$ is moved so far in transverse direction until the sliding plate 12 leans against the sleeve 24 of stop 19. With a further transverse motion of the controlling lever $e$ the sleeve 24 is displaced so far against the pressure of the spring 25 until the longitudinal motion of the controlling lever $e$ for throwing-in the fifth speed is possible. In the shifting diagram Fig. 6 the position of this stop is designated with 32. If on the contrary the shifting is to be done from the fifth speed for instance back to the fourth or third speed, the controlling lever $e$ is shifted first in longitudinal direction until the corresponding gear wheels are out of engagement. The succeeding transverse movement of the controlling lever $e$ produces a displacement of the sliding plate 12 to the point 33 (Fig. 6), where the slanting edge 30 comes in contact with the sleeve 20 of yielding stop 18. By these means the operator is aware that the transverse motion of the controlling lever $e$ has gone so far that now, for instance, the fourth speed may be thrown-in by a longitudinal shifting of the controlling lever $e$. The sleeve 20 is shifted by the height of the slanting edge 30 and the preliminary tension of the spring 22 is somewhat stronger. After the sleeve 20 is lifted above the slanting face the yielding resistance against the further shifting of the plate 12 ceases at present. The shifting steps of the second and first speed may now be thrown-in or out in a well known manner by a transverse and longitudinal motion of the main controlling lever $e$. When throwing in the reverse speed R, the sliding plate 12 must be moved previously to the stop 31, i. e. the operator is aware that the transverse motion of the sliding plate 12 or the controlling lever $e$ is accomplished. The spring 22 being previously set somewhat under pressure by the slanting edge 30 will be furthermore pressed together in continuing the motion of the sliding plate over the slanting edge 31. With the second motion of the stop 18, a substantially greater power is necessary for overcoming the pressure of the spring 22 than required for overcoming the slanting edge 30. When the sliding plate 12 has reached its utmost right hand position, the controlling lever $e$ may be shifted longitudinal for throwing-in the reverse speed. When returning from the reverse speed onto one of the forward speeds, the sliding plate 12 is moved again to the left, the sleeve 20 of the yielding stop 18 goes back over the slanting edge 31 or 30 into its new position. In the shifting diagram Fig. 6 the position of the yielding stop 18 is designated with 34.

Within the scope of the invention it will be possible to arrange and form the yielding stops also in a different way as described above, for instance in parallel to each other and both influenced by slanting edges, or the stops might be arranged in other places.

Having now particularly described and ascertained the nature of my invention, and in what manner the same is to be performed, I declare that what I claim is:

1. In a change speed gear a driving shaft, a driven shaft, arranged axially to the driving shaft, a transmission shaft, a pair of coacting spur wheels between the driving shaft and the transmission shaft, a pair of coacting spur wheels between the driven shaft and the transmission shaft, the spur wheel arranged on the transmission shaft being unrotatably fastened to this shaft and the spur wheel on the driven shaft being loosely turnable on this shaft, a change-over coupling on the driven shaft for alternatively coupling driven shaft with the driving shaft (i. e. for throwing-in the direct drive speed) or with the spur wheel being loosely turnable on it, a third and a fourth pair of coacting spur wheels between the transmission shaft and the driven shaft in driving direction in back of the first said pairs of spur wheels, the spur wheels mounted on the transmission shaft pertaining to the third and fourth pair of spur wheels being loosely turnable on this shaft, while the spur wheels mounted on the driven shaft being non-turnably connected to this shaft, a second changeover coupling on the transmission shaft for alternatively coupling the transmission shaft with the spur wheels journaled loosely on it, the wheels of the spur wheel pairs being so dimensioned that by the medium of the first pair of spur wheels the second pair of spur wheels affects a lower transmission ratio than the direct drive speed, but a higher transmission ratio than the third and fourth pair of spur wheels, and reverse gear mechanism also operable through the medium of the first-mentioned change-over coupling.

2. A change speed gear according to claim 1, the spur wheels of all of the four pairs of spur wheels being always in mesh with each other and the spur wheels of the first pair of spur wheels are arranged unturnably on their shafts.

3. A change speed gear according to claim 1, in combination with synchronising arrangements for synchronising the gear parts to be coupled with each other by means of the two change-over couplings.

4. A change speed gear according to claim 1, in combination with a fifth pair of spur wheels being continually in mesh, between the transmission shaft and the driven shaft, the spur wheel arranged on the transmission shaft being journalled loosely turnable on this shaft and the wheel on the driven shaft being unturnably connected with the driven shaft, and with a coupling member for coupling the transmission shaft with said spur wheel journalled loosely on it.

5. A change speed gear according to claim 1, in combination with a fifth pair of spur wheels being continually in mesh, between the transmission shaft and the driven shaft, the spur gear on the transmission shaft being journalled loosely turnable on it, and the spur wheel on the driven shaft being unturnably connected with the driven shaft, and with a coupling member for coupling the transmission shaft to the spur wheel journalled loosely turnable on it, the spur wheels of the fifth pair of spur wheels being so dimensioned that this pair, by the medium of the first pair of spur wheels, effects a higher transmission ratio than the direct drive speed (i. e. an over-direct drive speed).

6. A change speed gear according to claim 1, in combination with a crown wheel on the first mentioned change-over coupling, a spur wheel opposite to it on the transmission shaft, a further shaft and a further sliding wheel on this shaft, the shaft and the sliding wheel being so arranged that it may be engaged simultaneously to the mentioned crown wheel and the last mentioned spur wheel, in order to produce a reverse motion.

THEODOR KUMMICH.